United States Patent
Acero Acero et al.

(10) Patent No.: US 8,440,944 B2
(45) Date of Patent: May 14, 2013

(54) INDUCTION HEATER COMPRISING A CIRCULAR INDUCTOR COIL

(75) Inventors: Jesus Acero Acero, Zaragoza (ES);
Rafael Alonso Esteban, Huesca (ES);
Adolfo Arnal Valero, Zaragoza (ES);
Ruben Braulio Martinez, Zaragoza (ES); Claudio Carretero Chamarro, Zaragoza (ES); Ignacio Garde Aranda, Zaragoza (ES); Pablo Jesus Hernandez Blasco, Cuarte de Huerva (ES)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 392 days.

(21) Appl. No.: 12/811,554

(22) PCT Filed: Jan. 2, 2009

(86) PCT No.: PCT/EP2009/050003
§ 371 (c)(1),
(2), (4) Date: Jul. 2, 2010

(87) PCT Pub. No.: WO2009/090108
PCT Pub. Date: Jul. 23, 2009

(65) Prior Publication Data
US 2010/0282737 A1    Nov. 11, 2010

(30) Foreign Application Priority Data
Jan. 14, 2008  (ES) .................................. 200800172

(51) Int. Cl.
*H05B 6/12* (2006.01)
(52) U.S. Cl.
USPC ............................ 219/620; 219/624; 219/675
(58) Field of Classification Search .................. 219/600, 219/620, 624, 625, 247, 672, 674
See application file for complete search history.

(56) References Cited

U.S. PATENT DOCUMENTS

| | | | |
|---|---|---|---|
| 5,428,207 A | 6/1995 | Essig et al. | |
| 5,658,478 A * | 8/1997 | Roeschel et al. | 219/502 |
| 2008/0114429 A1 | 5/2008 | Nagano et al. | |
| 2009/0020526 A1* | 1/2009 | Roux | 219/672 |
| 2010/0243642 A1* | 9/2010 | Gouardo et al. | 219/622 |

FOREIGN PATENT DOCUMENTS

| | | |
|---|---|---|
| DE | 3731762 A1 | 3/1989 |
| EP | 936843 * | 8/1999 |
| EP | 0936843 A2 | 8/1999 |
| EP | 1575336 A1 | 9/2005 |
| WO | 8904109 A1 | 5/1989 |

* cited by examiner

*Primary Examiner* — Caridad Everhart
(74) *Attorney, Agent, or Firm* — James E. Howard; Andre Pallapies

(57) ABSTRACT

An induction heating element including a circular inductor coil that has a circular outer contour and a ferrite element arrangement that has at least one ferrite element with a radially outer edge. At least at one curvature point, the radially outer edge of the ferrite element is curved to a greater degree than the circular outer contour of the inductor coil.

15 Claims, 3 Drawing Sheets

INDUCTION HEATER COMPRISING A CIRCULAR INDUCTOR COIL

BACKGROUND OF THE INVENTION

The invention relates to an induction heating element having a circular inductor coil and an induction hob.

Induction hobs with induction heating elements are known from the prior art. Such induction heating elements have a circular inductor coil with a circular outer contour and a ferrite element arrangement with at least one ferrite element, which is disposed below the inductor coil. Ferrite elements are generally rectangular and run radially in their longitudinal direction so that a radial outer edge of the ferrite elements respectively is rectilinear and runs perpendicular to the radial direction of the induction heating element.

When shaping the ferrite elements the focus until now was in particular on achieving the most complete coverage possible of the surface of a circular inductor coil, in order thus to achieve a particularly effective magnetic field feedback and shielding function of the ferrite element arrangement.

It is also known to equip what are known as matrix induction hobs with a particularly large number of induction heating elements of comparatively small diameter, these being disposed in a square or hexagonal grid and covering a surface of the induction hob as completely as possible with a particularly high packing density. The induction heating elements are then disposed closed to one another so that the magnetic fields generated by the respective inductor coils are significantly influenced by the adjacent inductor coils and/or ferrite elements.

BRIEF SUMMARY OF THE INVENTION

The object of the invention is in particular to optimize the shape of the ferrite element of an induction heating element in respect of a functional and structural interaction with the adjacent induction heating elements.

The invention is based in particular on an induction heating element with a circular inductor coil with a circular outer contour and with a ferrite element arrangement. The ferrite element arrangement comprises at least one ferrite element with a radially outer edge.

In order specifically to break the rotational symmetry of the magnetic field generated by the induction heating element and to configure both the shape of the magnetic field and the shape of the induction heating element flexibly in respect of a structural and functional interaction with adjacent induction heating elements, it is proposed that the outer edge of the ferrite element be curved to a greater degree at one curvature point at least than the outer contour of the inductor coil, in order to modify the magnetic field generated by the induction coil specifically in the area around this curvature point. The magnetic field can in particular be bundled at the curvature point and the shape of the induction heating element and magnetic field can be tailored to the immediate area around the induction heating element. This also allows a high degree of coverage by the ferrite elements.

"Outer edge" is intended in particular to refer to a part of a convex envelope curve, i.e. the peripheral curve of the convex envelope of the ferrite element. The curvature point is in particular an inner point of the radially outer edge.

Particularly significant surface coverage by the ferrite element can be achieved if the radially outer edge of the ferrite element projects radially beyond the circular outer contour of the inductor coil in an area around the curvature point.

Total coverage of the inductor coil by the ferrite element can still be achieved whilst using only a small number of different components, if the ferrite element has essentially the shape of an open circular ring with an outer contour that deviates from the circular shape. The ferrite element arrangement then in particular comprises only one single ferrite element in this shape.

It is also proposed that the radially outer edge of the ferrite element has essentially the shape of a regular hexagon. This allows the shape of the induction heating element to be tailored to the adjacent induction heating elements in a hexagonal or honeycomb grid and it is possible to achieve a high degree of coverage of the cooking surface by the ferrite elements. The ferrite elements can be cut or stamped out of a flat material with little waste.

If the opening in the circular ring is designed for the passage of supply cables to the inductor coil, in other words has appropriate dimensions for the passage of the supply cables, it is possible to achieve a compact induction heating element with a flat structure. The opening can also serve for the passage of supply cables or readout cables of a temperature sensor disposed in the center of the induction heating element.

If the radially outer edge of the ferrite element has essentially the shape of a regular polygon and runs concentrically in relation to the induction coil, it is generally possible to achieve a homogenous magnetic field or heating power of the induction heating element arrangement with comparatively little material outlay, since the characteristics of a polygonal ferrite element are similar to the characteristics of a circular ferrite element, the outer contour of which corresponds to a circle around the polygon but the polygonal ferrite element can be produced with less material outlay.

A high degree of surface coverage by the ferrite elements can be achieved, if the radially outer edge of the ferrite element encloses the outer contour of the inductor coil. In particular the outer contour can form an inscribed circle of the hexagon shape of the ferrite element.

A further aspect of the invention relates to an induction hob having a number of induction heating elements disposed in a grid, in particular induction heating elements of the type described above. In particular the invention relates to induction hobs of the matrix type, where at least one first induction heating element is completely surrounded by at least four adjacent induction heating elements. If the grid is hexagonal or honeycomb, the induction heating element may be surrounded by six adjacent induction heating elements.

It is proposed that a convex envelope curve of the ferrite element arrangement of at least the first induction heating element should have extremes that are evenly distributed over the periphery of the induction heating element. A symmetry of the distribution of the extremes here corresponds to a symmetry of the grid. In particular the convex envelope curve of the ferrite element arrangement of at least the first induction heating element has a radial maximum or minimum in each instance at intersections with connecting straight lines between the center point of the first induction heating element and the center points of the adjacent heating elements. It is possible to achieve a very high degree of coverage by the ferrite elements if the ferrite element arrangement has a hexagon symmetry and in particular if the grid is a honeycomb grid. The term "convex envelope curve" refers to the smallest possible closed curve that encloses all the ferrite elements and is complex in the process here too.

BRIEF DESCRIPTION OF THE DRAWINGS

Further advantages will emerge from the description of the figures which follows. The figures show exemplary embodiments of the invention. The drawing, description and claims contain numerous features in combination. The person skilled in the art is advised to consider the features individually and combine them in expedient further combinations.

In the drawing.

DETAILED DESCRIPTION OF EXEMPLARY EMBODIMENTS OF THE PRESENT INVENTION

Figure 1:
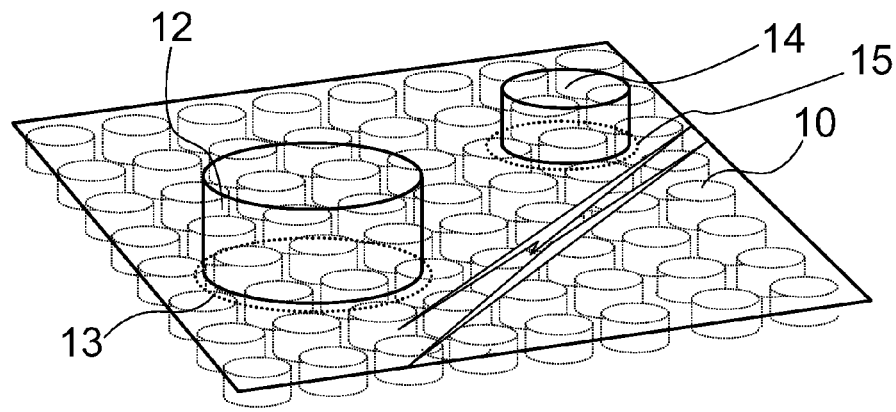
FIG. 1 shows a schematic diagram of a matrix induction hob having two cooking utensil elements.

FIG. 1 shows a schematic diagram of a matrix-type induction hob with induction heating elements 10, which in this exemplary embodiment are disposed in a rectangular grid. The induction hob comprises an electronic control unit (not shown here), which automatically detects cooking utensil elements 12, 14 on the induction hob and combines induction heating elements 10, which are covered partially or completely by one of the cooking utensil elements 12, 14, to form a heating zone 13, 15, using them to heat the respective cooking utensil element 12, 14.

Figure 2:
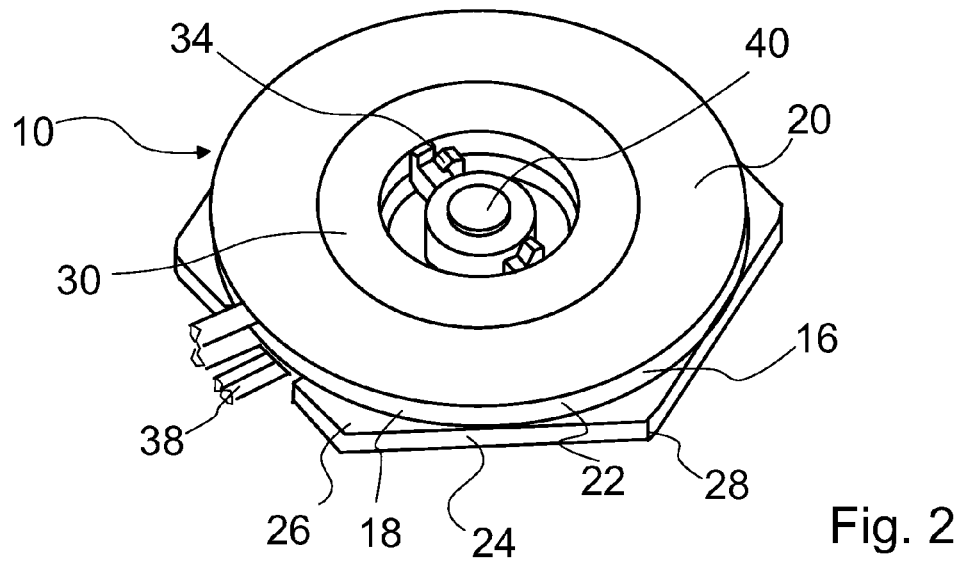
FIG. 2 shows an induction heating element of a matrix induction hob having a hexagonal ferrite element viewed from above.

FIG. 2 shows an induction heating element 10 viewed obliquely from below. The induction heating element 10 comprises a circular inductor coil 16, which is covered and insulated on both its upper and lower faces by a mica sheet 18, 20. The induction coil 16 has a circular outer contour 22, forming an inner circle of a radially outer edge 24 of a ferrite element 26. Apart from a cutout, the radially outer edge 24 of the ferrite element 26 has the shape of a regular hexagon with slightly rounded corners, which each form a curvature point 28, at which the outer edge 24 is curved to a much greater degree than the outer contour 22 of the inductor coil 16.

The ferrite element 26 and the inductor coil 16 are connected together in a detachable manner by way of two interacting connecting elements 30, 32 (FIG. 4) made of plastic. The connecting elements 30, 32 each engage in circular, centric openings in the inductor coil 16 and the ferrite element 26 and are connected together by way of latching elements 34, so that the connecting elements 30, 32 brace or clamp the inductor coil 16 and the ferrite element 26 together.

At the curvature points 28, which can be corners or vertices of convex roundings of the outer edge 24 of the ferrite element 26, the magnetic field generated by the induction heating element 10 is specifically modified. The radially outer edge 24 of the ferrite element 26 projects beyond the circular outer contour 22 of the induction coil 16 essentially over the entire periphery of the induction heating element 10. The same applies to the curvature points 28 of the radially outer edge 24 of the ferrite element 26.

Figure 2A:
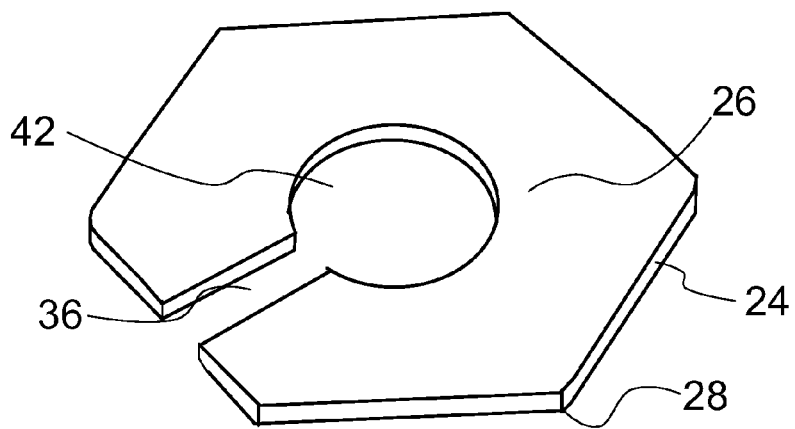
FIG. 2a shows a perspective view of the ferrite element from FIG. 2.

FIG. 2a shows a perspective view of the ferrite element 26 from FIG. 2. The ferrite element 26 has essentially the shape of an open circular ring with an essentially, i.e. apart from a small opening 36, hexagonal outer edge 24. The opening 36 in the circular ring is designed for the passage of supply cables 38 to the inductor coil 16 or for the passage of cables 39 (FIG. 4) for operating and reading out a temperature sensor 40. The temperature sensor 40 is held in the central opening 42 of the ferrite element 26 by the connecting elements 30, 32. The shape of the central opening 42 of the ferrite element 26 corresponds to the shape and size of a central, circular opening in the inductor coil 16.

The circular shape of the inductor coil 16 means that compared with inductor coils with a non-circular shape, variations in the radius of curvature of winding wires (not shown here) of the inductor coil 16 can be avoided over its periphery. In regions with more significant curvature such non-circular inductor coils tend to overheat, which can cause damage.

Figure 3:
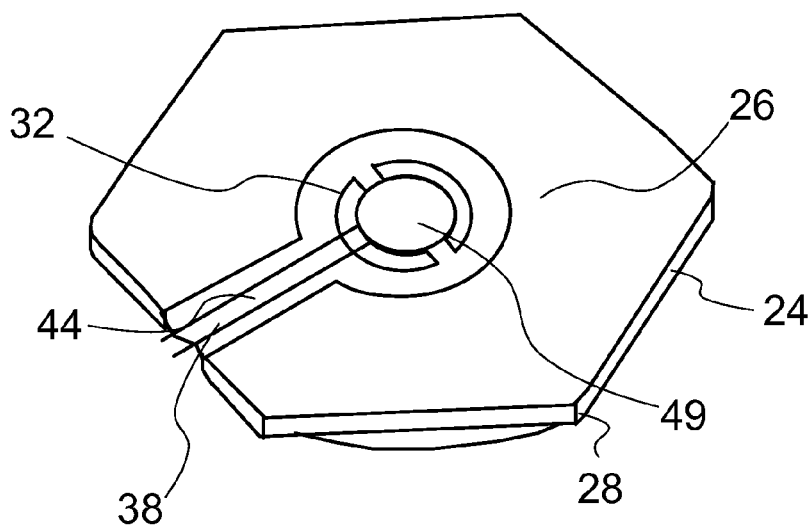
FIG. 3 shows the induction heating element from FIG. 2 viewed obliquely from below.

FIG. 3 shows the induction heating element 10 from FIG. 2 viewed obliquely from below. It can be seen that a cable channel 44 disposed in the opening 36 of the ferrite element 26 for the passage of the supply cable 38 is cast on the lower connecting element 32.

Figure 4:
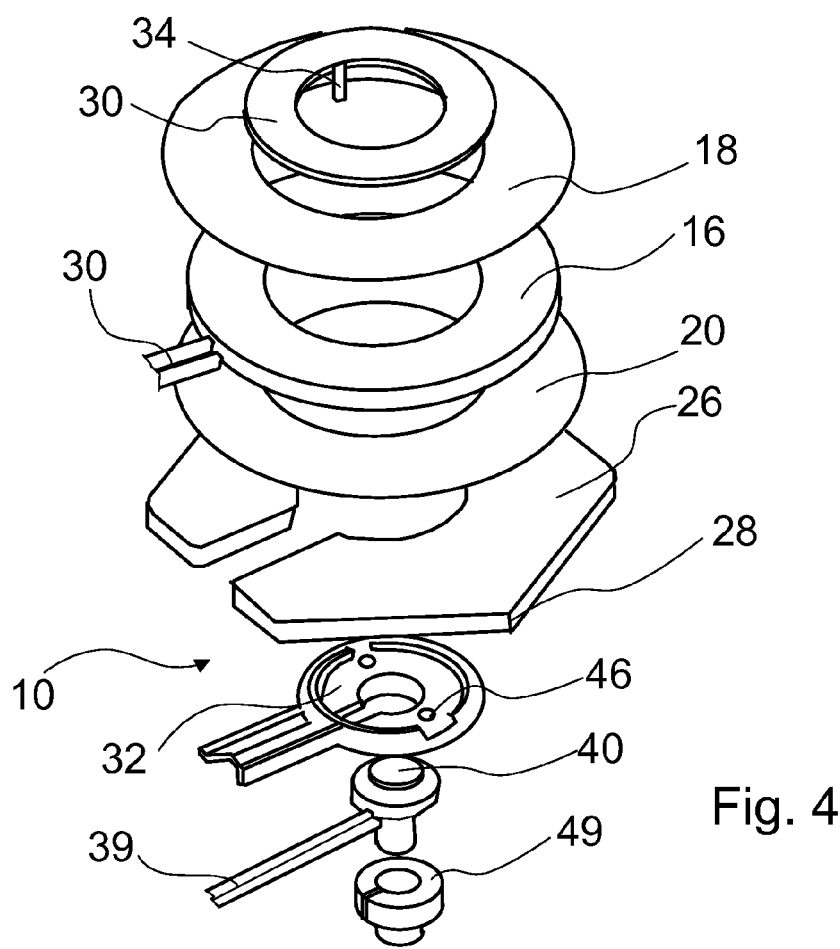
FIG. 4 shows an exploded view of the induction heating element from FIGS. 2 and 3.

FIG. 4 shows an exploded view of the induction heating element 10. To connect the components, the latching elements 34 must be inserted and latched into holes 46 in the lower connecting element 32. Assembly of the induction heating element 10 can therefore be carried out in a particularly simple manner and without tools. FIG. 4 also shows a rubber element 49 for holding the temperature sensor 40.

Figure 5:
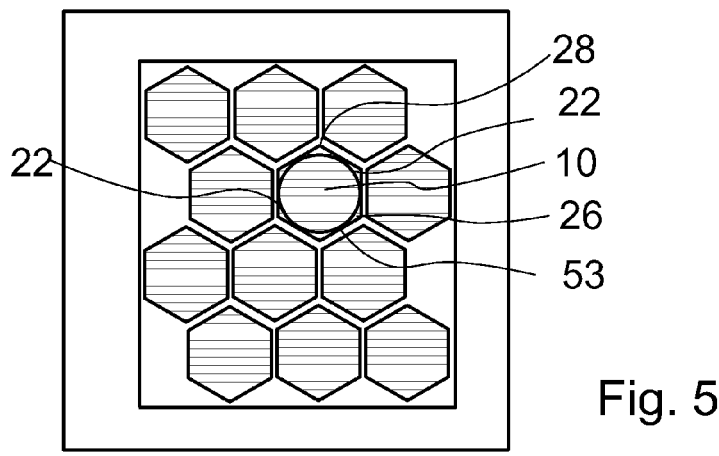
FIG. 5 shows an induction hob with hexagonal induction heating elements, which are disposed in a hexagonal grid, according to a first embodiment of the invention.

FIG. 5 shows an induction hob with a plurality of induction heating elements 10 of the type described above disposed in a honeycomb. The central induction heating elements 10 are each completely surrounded by six adjacent induction heating elements.

The convex envelope curve, formed essentially by the outer edge 24, of the ferrite element arrangement of the induction heating element 10 consisting of just one ferrite element 26 in each instance has the shape of a regular hexagon. It has respectively six maxima distributed isotropically over the periphery of the ferrite element 26 and six minima distributed isotropically over the periphery of the ferrite element 26. The maxima correspond to the curvature points 28 or corners of the hexagon and the minima correspond to the centers of the sides 53 of the hexagon. A symmetry of the distribution of the extremes therefore corresponds to a symmetry of the hexagon grid of the induction hob.

In the exemplary embodiment illustrated in FIG. 5 the induction heating elements 10 are disposed so that an overall honeycomb structure results and the adjacent sides of adjacent induction heating elements 10 run parallel at a distance of a few centimeters, for example around 1-2 cm.

This allows a high degree of coverage of the surface of the induction hob by the ferrite elements 26 to be achieved.

Figure 6:
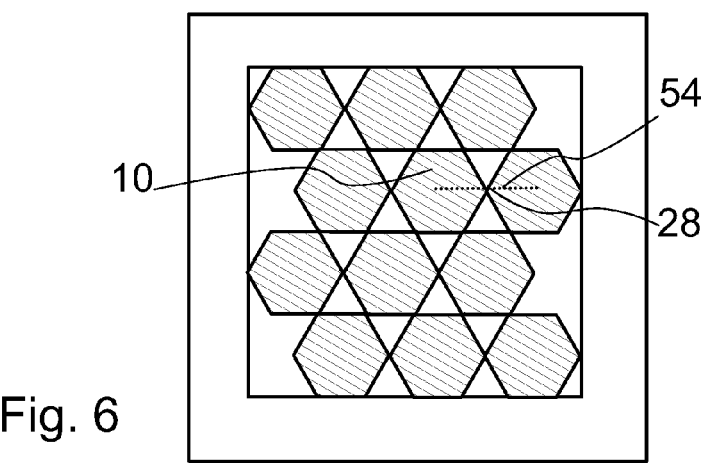
FIG. 6 shows an induction hob with hexagonal induction heating elements in a hexagonal grid according to a second embodiment of the invention and FIG. 7 shows a schematic diagram of a modular structure of the induction hob from FIG. 6.

FIG. 6 shows a further exemplary embodiment of the invention, in which the induction heating elements are disposed and oriented so that the corners of the hexagonal outer edge 24 of the ferrite elements 26 face one another or the curvature points 28 lie on connecting straight lines between the center points of adjacent induction heating elements 10. The convex envelope curve of the ferrite element arrangement therefore has a radial maximum at these points.

Figure 7:
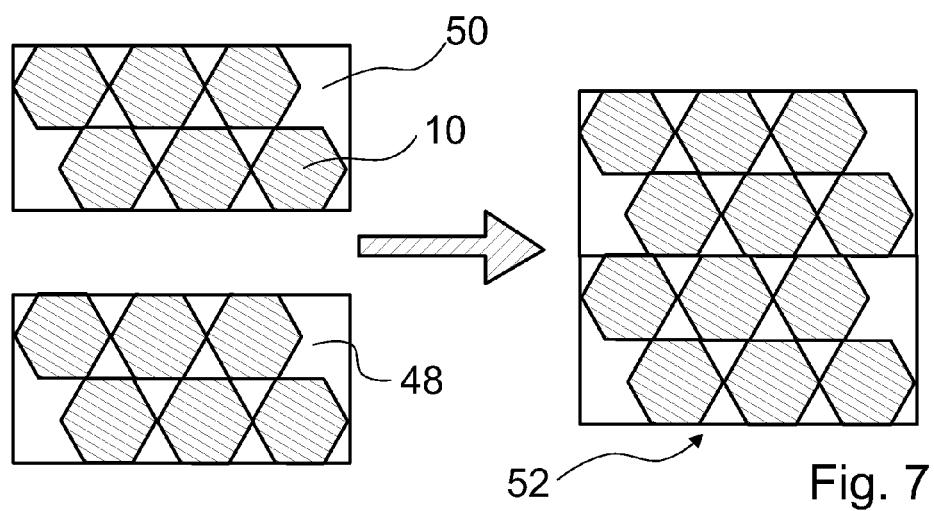

The arrangement of the induction heating elements 10 illustrated in FIG. 6 has structural advantages. As shown in FIG. 7, it is possible in a simple manner to join together two similar modules 48, 50 each having for example six induction heating elements 10 to form a hob 52. The modules 48, 50 can therefore be used in a flexible manner for hobs of different sizes and shapes.

The general idea behind the invention is of course not restricted to the exemplary embodiments described above but is defined by the accompanying claims. For example instead of single-part ferrite element arrangements it is also possible to use ferrite element arrangements with a number of ferrite elements and instead of the opening 36 in the ferrite element 26 it is possible to provide a groove.

LIST OF REFERENCE CHARACTERS

10 Induction heating element
12 Cooking utensil element
13 Heating zone
14 Cooking utensil element
15 Heating zone
16 Inductor coil
18 Mica sheet
20 Mica sheet
22 Outer contour
24 Edge
26 Ferrite element
28 Curvature point
30 Connecting element
32 Connecting element
34 Latching elements
36 Opening
38 Supply cable
39 Cable
40 Temperature sensor
42 Opening
44 Cable channel
46 Hole
48 Module
49 Rubber element
50 Module
52 Hob
53 Center of side
54 Connecting straight line

The invention claimed is:

1. An induction heating element, comprising:
a circular inductor coil having a circular outer contour; and
a ferrite element arrangement having at least one ferrite element with a radially outer edge, wherein, at at least one curvature point, the radially outer edge of the at least one ferrite element is curved to a greater degree than the circular outer contour of the inductor coil.

2. The induction heating element of claim 1, wherein, in an area around the curvature point, the radially outer edge of the ferrite element projects radially beyond the circular outer contour of the inductor coil.

3. The induction heating element of claim 1, wherein the radially outer edge of the ferrite element has essentially the shape of a regular polygon and runs concentrically in relation to the inductor coil.

4. The induction element of claim 1, wherein the radially outer edge of the ferrite element encloses the circular outer contour of the inductor coil.

5. The induction heating element of claim 1, wherein the ferrite element has essentially the shape of an open circular ring with an outer contour that deviates from a circular shape.

6. The induction heating element of claim 5, wherein the radially outer edge of the ferrite element has essentially the shape of a regular hexagon.

7. The induction heating element of claim 5, wherein an opening in the circular ring is designed for passage of supply cables to the inductor coil.

8. An induction hob, comprising:
a plurality of induction heating elements disposed in a grid;
wherein at least one first induction heating element is completely surrounded by at least four adjacent induction heating elements;
wherein a convex envelope curve of a ferrite element arrangement of the at least one first induction heating element has extremes that are evenly distributed over a periphery of the at least one first induction heating element; and
wherein a symmetry of the distribution corresponds to a symmetry of the grid.

9. The induction hob of claim 8, wherein the convex envelope curve of the ferrite element arrangement of the at least one first induction heating element has a respective radial maximum at intersections with connecting straight lines between a center point of the at least one first induction heating element and center points of adjacent heating elements.

10. The induction hob of claim 8, wherein the convex envelope curve of the ferrite element arrangement has a hexagon symmetry.

11. An induction heating element, comprising:
an inductor coil having an outer contour; and
a ferrite element arrangement having at least one ferrite element with an outer edge that is curved to a greater degree than the outer contour of the inductor coil and an opening designed for passage of supply cables to the inductor coil.

12. The induction heating element of claim 11, wherein, in an area around a curvature point of the ferrite element, the outer edge of the ferrite element projects radially beyond the outer contour of the inductor coil.

13. The induction heating element of claim 11, wherein the outer edge of the ferrite element has essentially the shape of a regular hexagon.

14. The induction heating element of claim 11, wherein the outer edge of the ferrite element has essentially the shape of a regular polygon.

15. The induction heating element of claim 11, wherein the outer edge of the ferrite element encloses the outer contour of the inductor coil.

* * * * *